(12) United States Patent
Jeromin et al.

(10) Patent No.: US 11,187,252 B2
(45) Date of Patent: Nov. 30, 2021

(54) MECHANICALLY PROGRAMMABLE CLOSED FLUID ACTUATION SYSTEM

(71) Applicant: UNIVERSAL CITY STUDIOS LLC, Universal City, CA (US)

(72) Inventors: Aaron Chandler Jeromin, Winter Garden, FL (US); Timothy Fitzgerald Garnier, Orlando, FL (US); Akiva Meir Krauthamer, Orlando, FL (US); Andrew Jayce Meersand, Somerville, NJ (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 17/061,527

(22) Filed: Oct. 1, 2020

(65) Prior Publication Data

US 2021/0102560 A1    Apr. 8, 2021

Related U.S. Application Data

(60) Provisional application No. 62/910,367, filed on Oct. 3, 2019.

(51) Int. Cl.
| | | |
|---|---|---|
| *F15B 15/18* | (2006.01) | |
| *F15B 7/06* | (2006.01) | |
| *F16H 53/02* | (2006.01) | |

(52) U.S. Cl.
CPC .............. *F15B 15/18* (2013.01); *F15B 7/06* (2013.01); *F16H 53/025* (2013.01); *F15B 2215/30* (2013.01)

(58) Field of Classification Search
CPC .......... F15B 15/18; F15B 7/06; F15B 53/025; F15B 2215/30; B25J 9/105; B25J 9/109; B25J 15/0226; B25J 9/142; B25J 15/12
See application file for complete search history.

(56) References Cited

U.S. PATENT DOCUMENTS

| | | | |
|---|---|---|---|
| 2,877,752 A | | 9/1957 | Schaller |
| 4,247,017 A | * | 1/1981 | Guigan ................ B65G 59/067 221/227 |

(Continued)

FOREIGN PATENT DOCUMENTS

CN    205807400 U    12/2016

OTHER PUBLICATIONS

International Search Report and Written Opinion, PCT/US2020/054144, dated Nov. 18, 2020, 10 pgs.

*Primary Examiner* — Thomas E Lazo
(74) *Attorney, Agent, or Firm* — Loza & Loza, LLP; Lew Edward V. Macapagal (57) ABSTRACT

Aspects of the disclosure relate to methods, apparatus, and systems for actuating a soft robot. An actuation system includes a camshaft, a motor configured to drive the camshaft to rotate around a rotational axis, and an air bladder configured to expel fluid from the air bladder during compression and draw fluid into the air bladder during decompression. The system further includes a cam coupled to the camshaft that is configured to rotate around the rotational axis when the camshaft is driven and compress or decompress the air bladder based on a physical profile of the cam as the cam rotates around the rotational axis. The system also includes a soft robot coupled to the air bladder, wherein the soft robot is actuated to move based on the fluid inserted into the soft robot during compression or the fluid removed from the soft robot during decompression.

20 Claims, 5 Drawing Sheets

(56) References Cited

U.S. PATENT DOCUMENTS

| | | | |
|---|---|---|---|
| 6,484,601 B1 * | 11/2002 | Arrichiello | B25J 9/14 294/106 |
| 6,718,766 B2 * | 4/2004 | Seto | B25J 9/142 60/476 |
| 2009/0108605 A1 | 4/2009 | Becker et al. | |
| 2016/0279803 A1 * | 9/2016 | Lessing | B32B 5/26 |
| 2016/0296838 A1 * | 10/2016 | Goetgeluk | A63F 13/285 |
| 2018/0056526 A1 | 3/2018 | Lynn et al. | |

* cited by examiner

MECHANICALLY PROGRAMMABLE CLOSED FLUID ACTUATION SYSTEM

CROSS-REFERENCE TO RELATED APPLICATION

This application claims priority to and the benefit of U.S. Provisional Application Ser. No. 62/910,367 entitled "MECHANICALLY PROGRAMMABLE CLOSED FLUID ACTUATION SYSTEM" filed on Oct. 3, 2019, the entire contents of which is incorporated herein by reference as if fully set forth below in its entirety and for all applicable purposes.

TECHNICAL FIELD

The technology discussed below relates generally to fluid actuation systems, and more particularly, to a fluid actuation system for actuating a soft robot.

INTRODUCTION

Robotics are used in many industries, such as manufacturing, industrial applications, medical applications, and the like. Most robotic systems are "hard", i.e., composed of metallic structures with joints based on conventional bearings. In an effort to expand the range of environments in which the robot operates, soft robotics has become an area of significant interest in recent years. Traditionally, soft robotics provide soft, conformal, and adaptive graspers that are employed in connection with robotic systems for grasping objects. For example, if an object is on a shelf, a moving belt, or being moved from a shelf to a belt, an end effector may adapt to picking up the object from various directions. As the field of soft robotics has developed, other applications have emerged, such as food applications making use of edible soft robots.

In general, a soft robot may be formed of elastic materials (e.g., rubber, plastic, or gelatin), that is configured to unfold, stretch, and/or bend under pressure, or other suitable relatively soft materials. The soft robot may be created, for example, by molding one or more pieces of the elastic material into a desired shape. The soft robot may include a hollow interior that can be filled with a fluid, such as air (or other gas) or water (or other liquid) to pressurize, inflate, and/or actuate the soft robot. Upon actuation, the shape or profile of the soft robot changes. In some cases, actuation may cause the soft robot to curve or straighten into a predetermined target shape. One or more intermediate target shapes between a fully unactuated shape and a fully actuated shape may be achieved by partially inflating the soft robot. Alternatively or in addition, the soft robot may be actuated using a vacuum to remove inflation fluid from the soft robot and thereby change the degree to which the soft robot bends, twists, and/or extends. As such, soft robots allow for types of motions or combinations of motions (including bending, twisting, extending, expanding, and contracting) that can be difficult to achieve with traditional hard robots.

As the field of soft robotics further develops, there is a need for a system that actuates a soft robot that is less power intensive, less electronically complex, and easier to maintain than previous soft robot actuation systems.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for actuating a soft robot. An actuation system includes a camshaft, a motor configured to drive the camshaft to rotate around a rotational axis, and an air bladder configured to expel fluid from the air bladder during compression and draw fluid into the air bladder during decompression. The system further includes a cam coupled to the camshaft that is configured to rotate around the rotational axis when the camshaft is driven and compress or decompress the air bladder based on a physical profile of the cam as the cam rotates around the rotational axis. The system also includes a soft robot coupled to the air bladder, wherein the soft robot is actuated to move based on the fluid inserted into the soft robot during compression or the fluid removed from the soft robot during decompression. Other aspects, embodiments, and features are also claimed and described.

In one example, an actuation system for actuating a soft robot is disclosed. The actuation system includes a camshaft, a motor configured to drive the camshaft to rotate around a rotational axis, an air bladder configured to expel fluid from the air bladder during compression of the air bladder and draw fluid into the air bladder during decompression of the air bladder, a cam coupled to the camshaft and configured to rotate around the rotational axis when the camshaft is driven and compress or decompress the air bladder based on a physical profile of the cam as the cam rotates around the rotational axis, and a soft robot coupled to the air bladder, wherein the soft robot is actuated to move based on the fluid expelled from the air bladder that is inserted into the soft robot during compression of the air bladder or the fluid removed from the soft robot that is drawn into the air bladder during decompression of the air bladder.

In one example, a method for actuating a soft robot is disclosed. The method includes driving a camshaft to rotate around a rotational axis, rotating a cam coupled to the camshaft around the rotational axis when the camshaft is driven, compressing or decompressing an air bladder based on a physical profile of the cam as the cam rotates around the rotational axis, expelling fluid from the air bladder during compression of the air bladder and drawing fluid into the air bladder during decompression of the air bladder, and actuating a soft robot coupled to the air bladder to move based on the fluid expelled from the air bladder that is inserted into the soft robot during compression of the air bladder or the fluid removed from the soft robot that is drawn into the air bladder during decompression of the air bladder.

In one example, an actuation system for actuating a soft robot is disclosed. The actuation system includes a main camshaft, a motor configured to drive the main camshaft to rotate around a first rotational axis, a branch camshaft coupled to the main camshaft in a non-collinear manner, wherein the branch camshaft rotates around a second rotational axis as the main camshaft rotates around the first rotational axis, an air bladder configured to expel fluid from the air bladder during compression of the air bladder and draw fluid into the air bladder during decompression of the air bladder, a cam coupled to the branch camshaft and configured to rotate around the second rotational axis when the main camshaft is driven and compress or decompress the air bladder based on a physical profile of the cam as the cam rotates around the second rotational axis, and a soft robot coupled to the air bladder, wherein the soft robot is actuated to move based on the fluid expelled from the air bladder that is inserted into the soft robot during compression of the air bladder or the fluid removed from the soft robot that is drawn into the air bladder during decompression of the air bladder.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Previous methods for actuating a soft robot include an actuation system using a number of electrically powered actuators to directly manipulate a fluid (e.g., gas or liquid) for bending, twisting, and/or extending the soft robot. The previous actuation system facilitates the fluid to flow either by compression or valving, for example, using an electronic computational control system. As such, the previous actuation system can be power intensive and electronically complex. Moreover, use of a pump-based system (e.g., for compression) or a valve-based system (e.g., for valving) may make it difficult to maintain a hermetic seal in the system. For example, a hermetically sealed system may be required for food applications, such as soft robotic candies. However, preventing food contaminants from entering every component of the pump-based or valve-based system may be challenging and/or costly. Accordingly, aspects of the present disclosure provide a mechanically programmable closed fluid actuation system configured to actuate a soft robot that is less power intensive, less electronically complex, and easier to hermetically seal than previous soft robot actuation systems.

Aspects of the present disclosure are related to a system and method for mechanically programming control of a soft robot fluid actuation system. Programmatic control allows input of a single constant speed rotational motion to drive a number of pressure-driven actuators in a closed system with complex output behavior. Here, the closed system refers to a fluid actuation system where the fluid is contained in the system itself.

In a closed, pressure-driven system, the fluid can be pressurized via a mechanical device, such as a cylinder, bulb, tube, or syringe that can be actuated using a motor. A single motor can be used to actuate the closed system. For example, a series of syringes may be controlled via a single laboratory syringe pump. As a result, all of the syringes may be actuated in the same manner (i.e., simultaneously and at the same pressure). In order to actuate the syringes in a complex manner (e.g., the syringes being pumped at different rates, times, etc.), while still using one input control, the syringes may be actuated via a mechanism, such as a camshaft, linkage system, or rotating disc having components that push against the syringes.

An aspect of the disclosure relates to a method for mechanically programming behavior of a pressure-driven actuation system by changing a shape of cam lobes on a camshaft. For example, in a system using a series of syringes actuated by a single control source (e.g., motor, hand-powered crank, wind, or water-driven generator, etc.), the syringes may be driven at different times and rates by rotating a camshaft having cam lobes of various shapes and orientation.

In an aspect, by connecting combinations of different actuators in series with each other, combinatorial logic may be used to control when a pressure-driven system is active. For example, an actuation system may include three lobes on a camshaft and each lobe compresses a single syringe. By connecting different combinations of the syringes to the three lobes, seven different pressure output behaviors are possible. This aspect may be implemented to create pneumatic computational machines.

An aspect of the disclosure relates to a method or program (e.g., software program) for converting a desired or recorded pressure profile (whether physical or simulated) into a cam lobe or other shaped device that produces the desired or recorded profile when formed on a rotating camshaft. The resulting profile may be 3D printed or otherwise manufactured.

The mechanically programmable closed fluid actuation system of the present disclosure has reduced complexity and costs less to manufacture compared to previous actuation systems because the present fluid-driven actuation system does not require valves or an electronic control system to program complex actuation behavior. Rather, the present fluid-driven actuation system may utilize one source of rotational motion to drive a number of actuators, each mechanically designed with different, complex pressure behaviors. Previous systems required valves and/or many sources of rotational or linear motion, and a computational control system, to drive the actuators.

Figure 1:
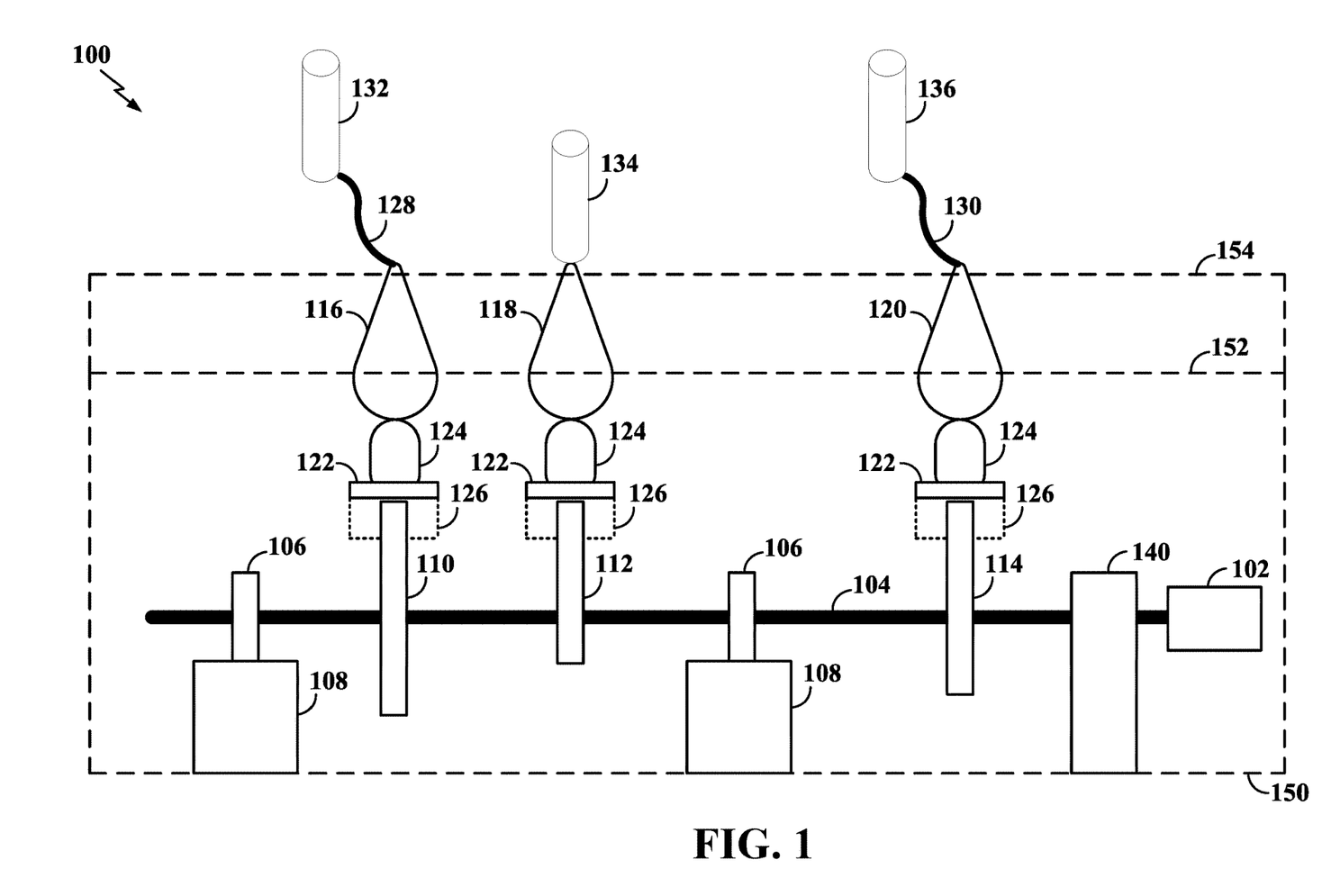
FIG. 1 illustrates a side view of an example of a mechanically programmable closed fluid actuation system according to an aspect of the present disclosure.
Figure 2:
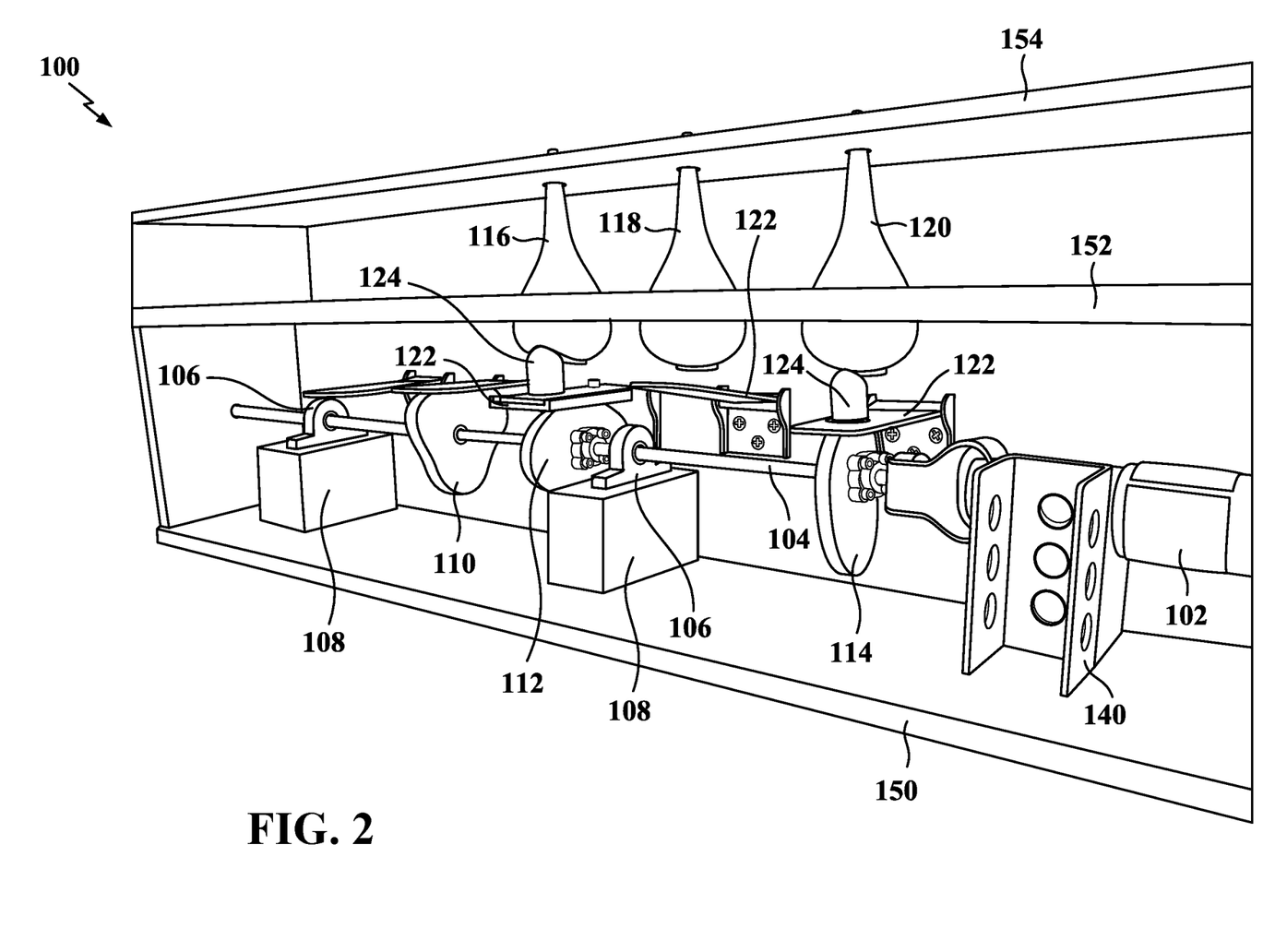
FIG. 2 illustrates a diagonal view of another example of the mechanically programmable closed fluid actuation system according to an aspect of the present disclosure.

FIG. 1 illustrates a side view of an example of a mechanically programmable closed fluid actuation system 100 according to an aspect of the present disclosure. FIG. 2 illustrates a diagonal view of another example of the mechanically programmable closed fluid actuation system 100 according to an aspect of the present disclosure. Referring to FIGS. 1 and 2, the actuation system 100 may be formed in a housing 150 including an inner shelf 152 and an upper shelf 154. The actuation system 100 includes a motor 102 configured to drive a camshaft 104 to rotate around a rotational axis. The motor 102 may be any suitable motor, such as an electric motor, a pneumatic motor, a computer-controlled motor, a DC motor, a hand crank motor, etc. In one example, the motor 102 may be coupled to the camshaft 104 via a support structure 140. A type of motor utilized may depend on a scale of an application for which the actuation system 100 is used. Rotation of the camshaft 104 is facilitated by one or more bearing assemblies 106 that may be secured to support blocks 108.

A number of cams (or cam lobes) 110, 112, 114 may be formed on, or coupled to, the camshaft 104. Each cam rotates along with the camshaft 104 as the camshaft 104 is driven by the motor 102. Although a total of three cams are depicted in the figures, it is contemplated that any number of cams (or cam lobes) may be implemented in the actuation system 100 depending on a strength of the motor 102 and the camshaft 104 to rotate the number of cams. The cams may be made of any type of material. For example, the cams may be made of a material that will not wear easily and/or made of a low-friction material, such as a low-friction plastic or high-density low-friction polymer.

The actuation system 100 may further include hinges 122 secured to a back wall of the housing 150 by brackets 126. Each of the hinges 122 is configured to move away from and move toward the rotational axis (e.g., swivel up and down) as it is contacted by a corresponding rotating cam 110, 112, or 114. A distance (e.g., height) at which the hinge 122 moves away from and moves toward the rotational axis (e.g., moves up and down) and a rate of the movement (e.g., up-and-down movement) is dependent on a physical profile of the cam 110, 112, or 114. For example, if the physical profile of the cam includes four small cam lobes, then the hinge 122 will move up and down four times per rotation with a relatively short maximum height as the cam contacts the hinge. In another example, if the physical profile of the cam includes two large cam lobes, then the hinge 122 will move up and down two times per rotation with a relatively tall maximum height as the cam contacts the hinge.

Fingers 124 may be formed on, or coupled to, the hinges 122 to aid in compressing and decompressing air bladders 116, 118, 120. For example, a finger 124 helps amplify the motion of a hinge 122 to exert a stronger force on an air bladder. In an aspect, as the camshaft 104 rotates the cam 110, 112, or 114 causing a hinge 122 to move away from the rotational axis (e.g., in an upward direction), a finger 124 will apply pressure to an air bladder causing the air bladder to compress and consequently expel fluid (e.g., gas or liquid) through an opening (e.g., nozzle) of the air bladder. As the camshaft 104 further rotates the cam 110, 112, or 114 causing the hinge 122 to move toward the rotational axis (e.g., in a downward direction), the finger 124 will release the pressure applied to the air bladder causing the air bladder to decompress and consequently draw fluid into the air bladder through the opening. In an aspect, the air bladder may be a bulb syringe as depicted in the figures. However, any other type of syringe or air bladder capable of expelling/drawing fluid at a pressure may be implemented in the actuation system 100.

The air bladders 116, 118, 120 may be supported in the housing 150 via the inner shelf 152. Moreover, a portion of the air bladders 116, 118, 120 may be exposed through the upper shelf 154 of the housing 150 for easier coupling with a component to be actuated, such as a soft robot. As shown in FIG. 1, a first air bladder 116 is coupled to a first soft robot 132, a second air bladder 118 is coupled to a second soft robot 134, and a third air bladder 120 is coupled to a third soft robot 136. In an aspect, an air bladder may be directly coupled to a soft robot as in the case of the second air bladder 118 being directly coupled to the second soft robot 134. In other aspects, the air bladder may be coupled indirectly coupled to the soft robot via a hose (or tube), as in the case of the first air bladder 116 being coupled to the first soft robot 132 via a hose 128, and in the case of the third air bladder 120 being coupled to the third soft robot 136 via a hose 130. Use of the hose allows actuation of a corresponding soft robot to occur an extended distance away from the air bladder. Thus, sound dampening may be facilitated if the motor 102 driving the actuation system 100 is located a distance away from the soft robot such that a user hears the motor 102 with less intensity.

As the camshaft 104 rotates, the cam 110, 112, or 114 causes the air bladder 116, 118, or 120 to compress and expel fluid (e.g., via the hinge 122 and finger 124) for actuating the soft robot 132, 134, or 136. In an aspect, the soft robot 132, 134, or 136 is formed of an elastic material (e.g., rubber, plastic, or gelatin) or other suitably soft material that is configured to unfold, stretch, and/or bend under pressure from the fluid expelled from the air bladder 116, 118, or 120. The soft robot 132, 134, or 136 may be created, for example, by molding one or more pieces of the elastic material into a desired shape. The soft robot may include a hollow interior (or chamber) that can be filled with the aforementioned fluid to pressurize, inflate, and/or actuate the soft robot. Upon actuation, the shape or profile of the soft robot changes. For example, actuation may cause the soft robot to curve or straighten into a predetermined target shape. Moreover, an intermediate target shape between a fully unactuated shape and a fully actuated shape may be achieved by partially inflating the soft robot. Alternatively or in addition, the soft robot may be actuated using a vacuum to remove inflation fluid from the soft robot and thereby change the degree to which the soft robot bends, twists, and/or extends.

In an aspect of the disclosure, the actuation system 100 may be implemented for use in theme park restaurants and attractions where the soft robot 132, 134, or 136 is a soft robotic candy, such as a gummy candy. The gummy candy includes flexible air chambers that are inflatable with the fluid expelled from the air bladder 116, 118, or 120. A shape of a chamber in the gummy candy may be carefully designed such that the gummy candy moves as desired when actuated by the air bladder. In an example scenario, many of the components of the actuation system 100 may be placed under a restaurant counter (or food display table) while a tray of gummy candies are placed on top of the counter in near proximity to the upper shelf 154 such that the gummy candies may be coupled to the air bladders 116, 118, 120. Accordingly, when the actuation system 100 is activated, the air bladders expel fluid and cause the gummy candies to move (e.g., bend, twist, extend, expand, contract, etc.) as designed, encouraging a customer to purchase and eat the candy. In an aspect, a switch or sensor extending from, or in communication with, the motor 102 may be placed on or near the upper shelf 154 or other exterior surface of the actuation system 100. Accordingly, for example, when the switch is pressed (e.g., by the tray of gummy candies) or when the sensor senses an input (e.g., customer's hand), the motor 102 is activated (or motor speed is increased/decreased) to actuate a soft robot.

In some aspects, a volume capacity of an air bladder and a volume capacity of a soft robot may be considered. For example, if the volume capacity of the air bladder is small while the volume capacity of the soft robot is large, then the soft robot may underinflate when the air bladder expels fluid into the soft robot. Alternatively, if the volume capacity of the air bladder is large while the volume capacity of the soft robot is small, then the soft robot may overinflate and/or explode when the air bladder expels fluid into the soft robot. Accordingly, a one-to-one ratio of volume capacities between the air bladder and the soft robot may be preferred for an application, unless the application is to intentionally underinflate or overinflate the soft robot (e.g., pop the soft robot for theatrical/dramatic effect). Moreover, a pressure-release valve may be implemented in the actuation system 100 to prevent the soft robot from overinflating.

An advantage of the actuation system 100 is that it provides a less complex way of programming a desired movement of the soft robot. In a previous soft robot actuation system, individual linear actuators or valves are programmatically controlled to perform a desired pressure profile. Thus, an entire system would have to be electronically programmed to control the actuators/valves. In contrast, the actuation system 100 is simplified because the pressure profile is programmed directly into the camshaft 104. As shown in FIG. 2, the camshaft 104 may have cams 110, 112, 114 of varying shapes, the shapes of which are encoded/designed with a desired pressure profile. Examples of some pressure profiles include a heartbeat profile (causes soft robot to pulse like a heartbeat), a profile that causes the soft robot to inflate/deflate at a specific rate, etc.

In an aspect of the disclosure, two or more cams of the actuation system 100 may be combined. For example, the hose 128 coupled to the first air bladder 116 actuated by a first cam 110 may be combined with the hose 130 coupled to the third air bladder 130 actuated by a third cam 114. As such, if one of the hoses expels fluid at a low or negative pressure and the other hose expels fluid at a positive pressure, a mix of pressures would be possible based on the combination.

In an aspect, although the actuation system 100 is depicted to have a single motor 102, multiple motors may be implemented. For example, two camshafts may be utilized, each driven by a corresponding motor of the same or different speed. Thus, one motor may run at an increased speed while the other motor may run at a decreased speed. Accordingly, pressure profiles from each camshaft may be combined to generate a merged pressure profile. Such implementation increases the number of potential pressure profiles while keeping the number of input motors to a minimum. In another aspect, the multiple camshafts may be geared such that the camshafts are attached to the same motor but driven at different speeds.

In an aspect, the cams and air bladders may be designed to specifically actuate one or more soft robots such that the soft robots appear to move in a near-random manner (i.e., movement of the soft robots do not repeat for a long period of time) depending on how the combinations of the cams to the soft robots are setup. Hence, the cams and air bladders, and combinations thereof, may be designed to actuate with enough variations over a certain amount of time such that the movement of the soft robots appear to look random. In a further aspect, the cams and air bladders, and combinations thereof, may be designed to generate any arbitrary pressure profile. This may be useful for various pneumatic operations, e.g., an animated figure with a mouth that moves based on a pneumatic pressure or any particular mouth profile that moves based on dialogue.

In an aspect, a single soft robot may include two separate air chambers. One air bladder actuated by one cam may operate with one air chamber of the soft robot while another air bladder actuated by a different cam may operate with the other air chamber of the soft robot. As an example result, the soft robot may be caused to lean left based on the actuation from one cam and caused to lean right based on the actuation from the other cam. Additionally, if one air chamber is inflated by one air bladder while air is being pulled from the other air chamber by the other air bladder, then the movement of the soft robot as it leans left or right may be intensified.

In an aspect of the disclosure, instead of using the camshaft 104, other types of driving mechanisms may be used to actuate the air bladders. For example, the actuation system 100 may utilize a disk having bumps, indentations, valleys, or grooves that actuate the air bladders 116, 118, 120. The disk may rotate around a vertical axis similar to the rotation of a record on a record player. In another example, the actuation system 100 may utilize a drum having bumps formed on an inner wall and/or an outer wall of the drum, wherein the bumps actuate the air bladders. In a further example, the actuation system 100 may utilize a belt having bumps or grooves for actuating the air bladders.

In an aspect, the bumps or grooves on a disk of a record-type actuation system may be amplified. For example, a lever or bar linkage system may be used to amplify a scale of motion at the cost of torque. That is, if the motor used in the actuation system has a sufficient amount of torque, and the force of a moving element against a bump or groove is sufficiently large, then the motion of the moving element may be amplified. Accordingly, very small bumps or grooves may create a very large end effect on the soft robot.

In an aspect, when implementing the disk of the record-type actuation system, pistons with rollers may be utilized instead of the hinges 122. As the bumps or grooves of the disk rotate around the vertical axis, the rollers may roll along with the bumps or grooves causing the pistons to move up and down. This may be useful for implementing more actuating mechanisms in the actuation system 100 than what is possible using the hinges 122.

In an aspect, if air is to be drawn from a soft robot, the soft robot may be attached to an air bladder (or hose coupled to the air bladder) when the air bladder is at least partially compressed. When the air bladder expands, the air bladder will draw air from the soft robot. Later, the air bladder may be compressed beyond its initial partially compressed state to inflate the soft robot. In a further aspect, the actuation system 100 may also include a reset cam that may engage the air bladders periodically or on demand to neutralize the pressure in the system. The reset cam holds the air bladders open to reset the air bladders to an initial or default state.

In an aspect of the disclosure, multiple air bladders may be actuated by a single cam. For example, an actuation system may include a drive shaft having a vertical orientation. Accordingly, the multiple air bladders may be arranged around the vertically-oriented drive shaft such that a single cam coupled to the drive shaft may be configured to actuate the air bladders as the cam is driven by the drive shaft to rotate around a vertical axis.

Figure 3:
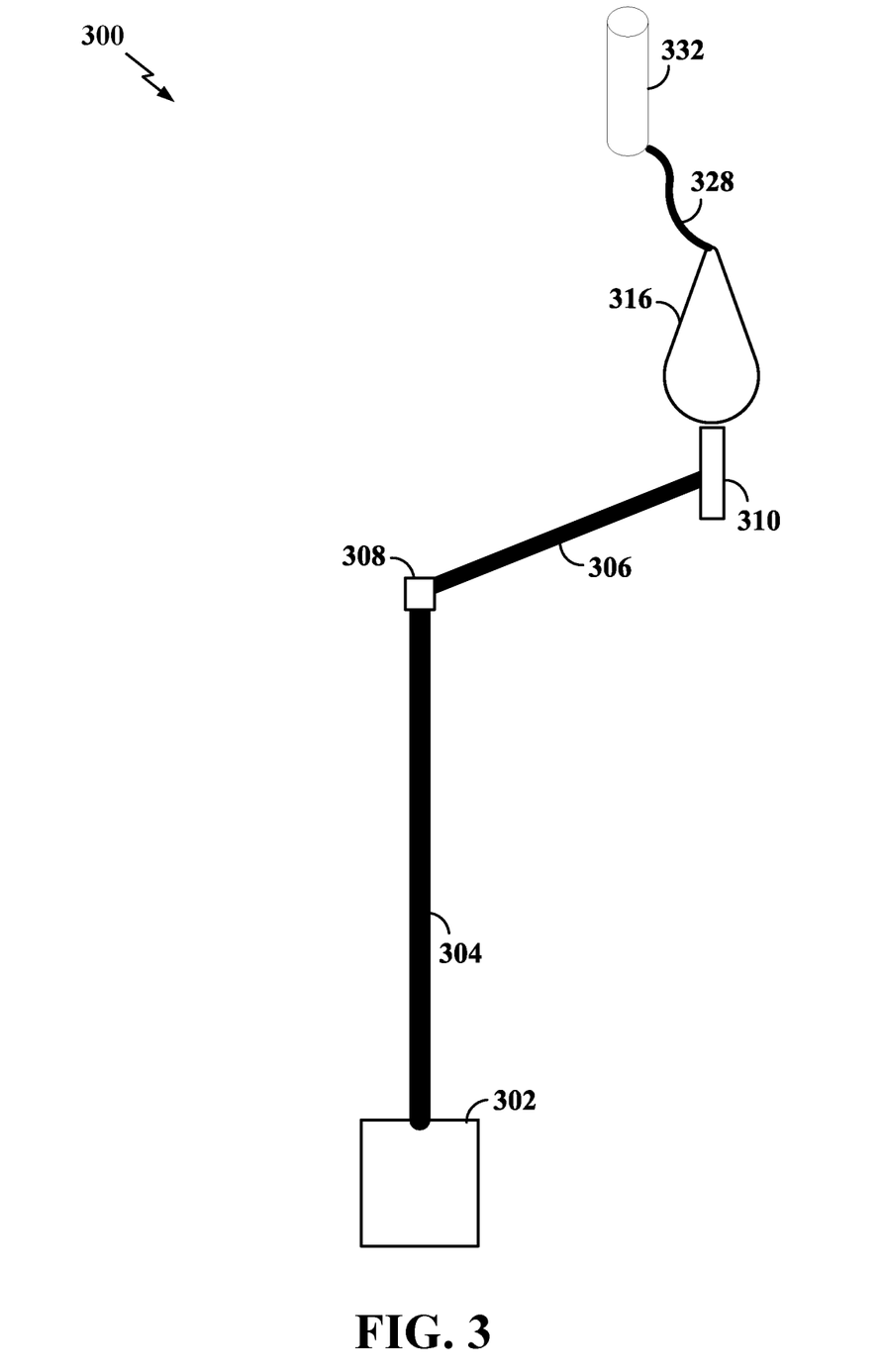
FIG. 3 illustrates an example of a mechanically programmable closed fluid actuation system according to another aspect of the present disclosure.

In an aspect of the disclosure, two or more camshafts may be combined via a joint mechanism such that a single motor can drive multiple camshafts through a complex joint structure. For example, FIG. 3 illustrates an example of a mechanically programmable closed fluid actuation system 300 according to an aspect of the present disclosure. The fluid actuation system 300 includes a motor 302 and a main camshaft 304. The main camshaft 304 is oriented in a vertical direction. Accordingly, the motor 302 is configured to drive the main camshaft 304 to rotate around a first rotational axis (e.g., vertical axis). The main camshaft 304 is coupled to a branch camshaft 306 at an angle (in a non-collinear manner) via a universal joint 308. When the motor 302 drives the main camshaft 304 to rotate around the first rotational axis, a rotational power of the motor 302 is transmitted to the branch camshaft 306 at an angle (via the universal joint 308) causing the branch camshaft 306 to rotate around a second rotational axis. As the branch camshaft 306 rotates, a cam 310 coupled to the branch camshaft 306 is caused to rotate and compress an air bladder 316 (e.g., via a hinge and/or finger not shown). When compressed, the air bladder 316 expels fluid for actuating a soft robot 332 (e.g., via a hose 328).

In an aspect, the actuation system 300 of FIG. 3 may be implemented in a decorative tree structure having one or more branches. The motor 302 may be housed at a base of a tree and the main camshaft 304 may extend vertically within a trunk of the tree. Moreover, the branch camshaft 306, the cam 310, and the air bladder 316 may be housed within a branch of the tree while the soft robot 332 may be placed exterior to the branch.

In an aspect of the disclosure, the fluid used in the actuation system of the present disclosure is a gas that is safe to eat and/or breathe (food-safe gas), such as ambient air, oxygen, nitrogen, etc. When nitrogen is used, the actuation system may further include separate valving for injecting nitrogen into an air bladder and a soft robot. The nitrogen may be injected into the air bladder and the soft robot before coupling the two components together. This helps replace the ambient air in the system with nitrogen in a more efficient manner. In operation, when the soft robot filled with nitrogen is disconnected from the air bladder, the nitrogen safely leaks into the atmosphere.

In an aspect of the disclosure, the actuation system of the present disclosure may include two bladders coupled to the same soft robot, wherein a first bladder is filled with a gas (e.g., air) and a second bladder is filled with a liquid (e.g., water or juice). Each bladder may be actuated by a different cam. By rotating a cam corresponding to the first bladder, the actuation system may actuate the first bladder filled with the gas to cause the soft robot to move (e.g., bend, twist, extend, etc.). Later, as a result of the soft robot being disconnected from the actuation system or on occasion, a cam corresponding to the second bladder may be rotated by the actuation system to press against the second bladder filled with the liquid causing the liquid to be sprayed.

Figure 4:
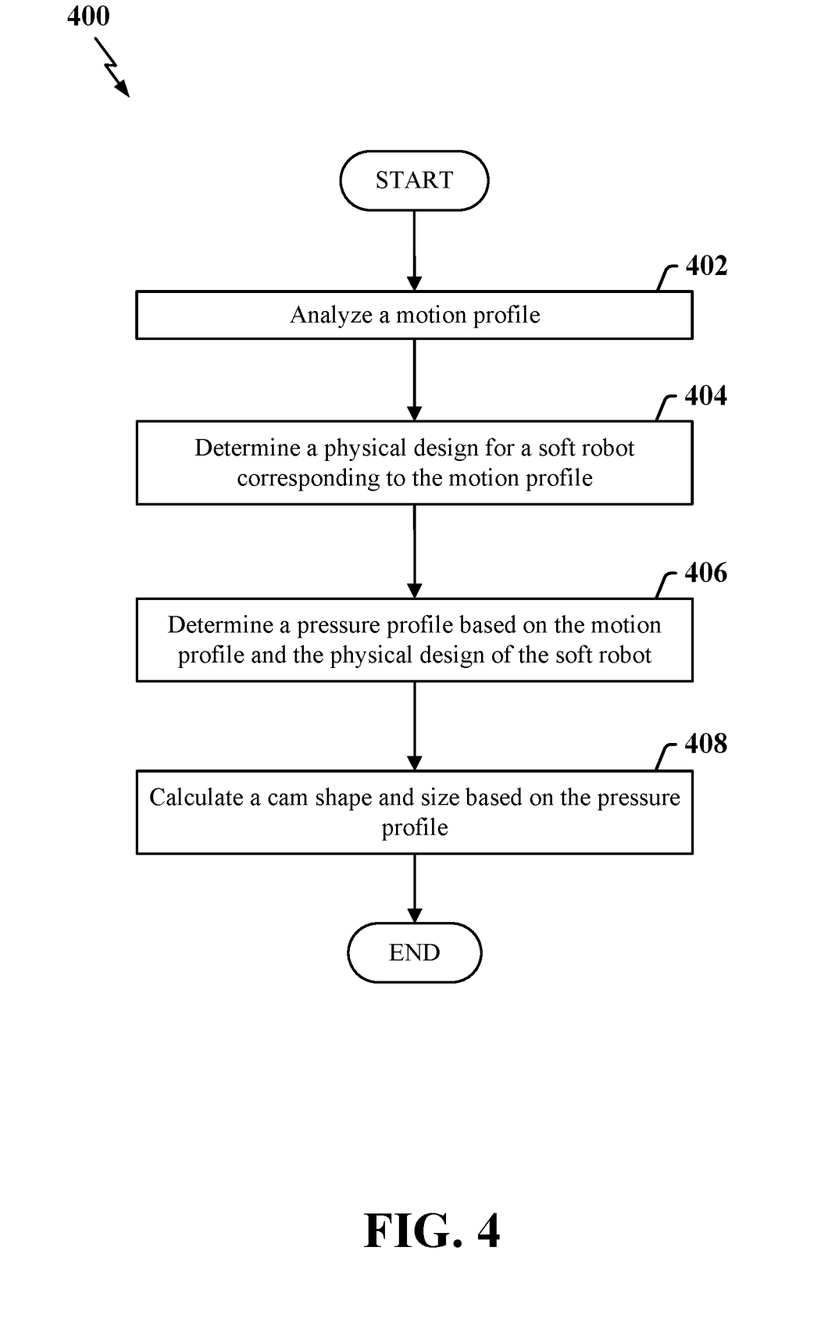
FIG. 4 is a flow chart illustrating an exemplary process for converting a desired or recorded pressure profile into a cam shape that produces the desired or recorded pressure profile when formed on, or coupled to, a rotating camshaft according to an aspect of the present disclosure.

FIG. 4 is a flow chart illustrating an exemplary process 400 for converting a desired or recorded pressure profile into a cam (or cam lobe) shape that produces the desired or recorded pressure profile when formed on, or coupled to, a rotating camshaft according to an aspect of the present disclosure. A resulting profile may be generated by a fabrication machine (e.g., 3D printer, laser cutting machine, etc.). In some examples, the process 400 may be carried out by a computer or any suitable apparatus or means for carrying out the functions or algorithm described below.

At block 402, a motion profile is analyzed. For example, an animator may animate a digital character according to a desired movement or motion profile. Accordingly, the process includes analyzing the motion profile in order to translate the desired movement onto a soft robot.

At block 404, a physical design for the soft robot is determined corresponding to the motion profile. That is, the process involves deciding on the physical dimensions of the soft robot to allow for the types of movement expected based on the motion profile.

At block 406, a pressure profile is determined based on the motion profile and the physical design of the soft robot. For example, the process involves analyzing the motion profile and the physical design of the soft robot and deciding the pressure characteristics (e.g., types of pressures, amount of pressure, rate of pressure, etc.) needed that will result in the soft robot performing the motion profile.

At block 408, a cam shape and size is calculated based on the pressure profile. That is, the process involves deciding how the cam (or cam lobe) is to be mechanically manufactured, shaped, and sized in order for the cam to create the pressure profile. The process may further involve an ideal motor speed for rotating the cam that will create the pressure profile.

Figure 5:
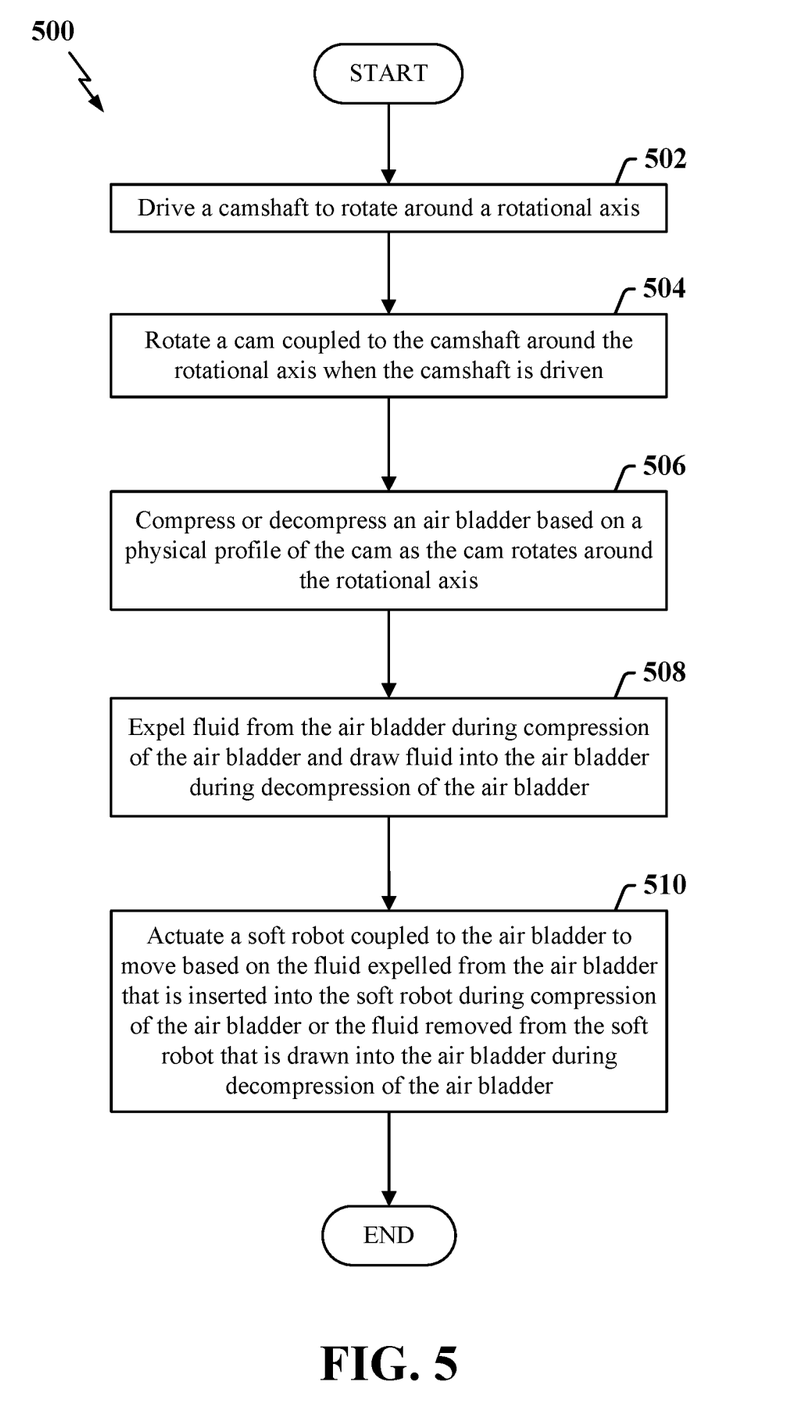
FIG. 5 is a flow chart illustrating an exemplary process for actuating a soft robot according to an aspect of the present disclosure.

FIG. 5 is a flow chart illustrating an exemplary process 500 for actuating a soft robot according to an aspect of the present disclosure. As described below, some or all illustrated features may be omitted in a particular implementation within the scope of the present disclosure, and some illustrated features may not be required for implementation of all embodiments. In some examples, the process 500 may be carried out by a fluid actuation system illustrated in FIGS. 1 and 2. In some examples, the process 500 may be carried out by any suitable apparatus or means for carrying out the functions or algorithm described below.

At block 502, the actuation system drives a camshaft (e.g., camshaft 104) to rotate around a rotational axis.

At block 504, the actuation system rotates a cam (e.g., cam 110, 112, or 114) coupled to the camshaft around the rotational axis when the camshaft is driven.

At block 506, the actuation system compresses or decompresses an air bladder (e.g., air bladder 116, 118, or 120) based on a physical profile of the cam as the cam rotates around the rotational axis. In an aspect, the actuation system performs compression or decompression of the air bladder by moving a hinge (e.g. hinge 122) in a direction away from the rotational axis (e.g., in an upward direction) or a direction toward the rotational axis (e.g., in a downward direction) based on the physical profile of the cam as the cam rotates around the rotational axis. The air bladder may be compressed with a finger (e.g., finger 124) formed on the hinge as the hinge moves in the direction away from the rotational axis and decompressed with the finger as the hinge moves in the direction toward the rotational axis.

At block 508, the actuation system expels fluid from the air bladder during compression of the air bladder and draws fluid into the air bladder during decompression of the air bladder. The fluid may be a liquid or a gas.

At block 510, the actuation system actuates a soft robot (e.g., soft robot 132, 134, or 136) coupled to the air bladder to move (e.g., bend, twist, extend, expand, contract, etc.) based on the fluid expelled from the air bladder that is inserted into the soft robot during compression of the air bladder or the fluid removed from the soft robot that is drawn into the air bladder during decompression of the air bladder. In an aspect, the soft robot is coupled to the air bladder via a hose (e.g., hose 128 or 130). In an aspect, a volume capacity of the soft robot is equal to a volume capacity of the air bladder.

In an aspect, the actuation system may rotate at least one other cam (e.g., cam 110, 112, or 114) coupled to the camshaft around the rotational axis when the camshaft is driven (block 504) and compress or decompress at least one other air bladder (e.g., air bladder 116, 118, or 120) based on a physical profile of the at least one other cam as the at least one other cam rotates around the rotational axis (block 506). The actuation system may further expel fluid from the at least one other air bladder during compression of the at least one other air bladder and draw fluid into the at least one other air bladder during decompression of the at least one other air bladder (block 508). The actuation system may also actuate at least one other soft robot (e.g., soft robot 132, 134, or 136) coupled to the at least one other air bladder to move based on the fluid expelled from the at least one other air bladder that is inserted into the at least one other soft robot during compression of the at least one other air bladder or the fluid removed from the at least one other soft robot that is drawn into the at least one other air bladder during decompression of the at least one other air bladder.

In an aspect, the cam (e.g., cam 110) and the at least one other cam (e.g., cam 114) may compress or decompress the same air bladder. In another aspect, the soft robot includes a first air chamber and a second air chamber. Accordingly, the air bladder (e.g., air bladder 116) may expel fluid into the first air chamber or draw fluid from the first air chamber and the at least one other air bladder (e.g., air bladder 120) may expel fluid into the second air chamber or draw fluid from the second air chamber.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-5 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An actuation system for actuating a soft robot, the actuation system comprising:
    a camshaft;
    a motor configured to drive the camshaft to rotate around a rotational axis;
    an air bladder configured to expel fluid from the air bladder during compression of the air bladder and draw fluid into the air bladder during decompression of the air bladder;
    a cam coupled to the camshaft and configured to:
        rotate around the rotational axis when the camshaft is driven, and
        compress or decompress the air bladder based on a physical profile of the cam as the cam rotates around the rotational axis; and
    a soft robot coupled to the air bladder, wherein the soft robot is actuated to move based on the fluid expelled from the air bladder that is inserted into the soft robot during compression of the air bladder or the fluid removed from the soft robot that is drawn into the air bladder during decompression of the air bladder.

2. The actuation system of claim 1, further comprising:
    a hinge configured to cooperate with the cam; and
    a finger formed on the hinge,
    wherein the hinge moves in a direction away from the rotational axis or a direction toward the rotational axis based on the physical profile of the cam as the cam rotates around the rotational axis, and
    wherein the finger compresses the air bladder as the hinge moves in the direction away from the rotational axis and decompresses the air bladder as the hinge moves in the direction toward the rotational axis.

3. The actuation system of claim 1, wherein the fluid is a liquid or a gas.

4. The actuation system of claim 1, wherein the soft robot is coupled to the air bladder via a hose.

5. The actuation system of claim 1, wherein a volume capacity of the soft robot is equal to a volume capacity of the air bladder.

6. The actuation system of claim 1, further comprising:
    at least one other air bladder configured to expel fluid from the at least one other air bladder during compression of the at least one other air bladder and draw fluid into the at least one other air bladder during decompression of the at least one other air bladder;
    at least one other cam coupled to the camshaft and configured to:

rotate around the rotational axis when the camshaft is driven, and compress or decompress the at least one other air bladder based on a physical profile of the at least one other cam as the at least one other cam rotates around the rotational axis; and at least one other soft robot coupled to the at least one other air bladder, wherein the at least one other soft robot is actuated to move based on the fluid expelled from the at least one other air bladder that is inserted into the at least one other soft robot during compression of the at least one other air bladder or the fluid removed from the at least one other soft robot that is drawn into the at least one other air bladder during decompression of the at least one other air bladder.

7. The actuation system of claim 6, wherein the cam and the at least one other cam are further configured to compress or decompress the same air bladder.

8. The actuation system of claim 6, wherein:
the soft robot comprises a first air chamber and a second air chamber,
the air bladder is configured to expel fluid into the first air chamber or draw fluid from the first air chamber, and
the at least one other air bladder is configured to expel fluid into the second air chamber or draw fluid from the second air chamber.

9. A method for actuating a soft robot, comprising:
driving a camshaft to rotate around a rotational axis;
rotating a cam coupled to the camshaft around the rotational axis when the camshaft is driven;
compressing or decompressing an air bladder based on a physical profile of the cam as the cam rotates around the rotational axis;
expelling fluid from the air bladder during compression of the air bladder and drawing fluid into the air bladder during decompression of the air bladder; and
actuating a soft robot coupled to the air bladder to move based on the fluid expelled from the air bladder that is inserted into the soft robot during compression of the air bladder or the fluid removed from the soft robot that is drawn into the air bladder during decompression of the air bladder.

10. The method of claim 9, wherein the compressing or decompressing the air bladder comprises:
moving a hinge in a direction away from the rotational axis or a direction toward the rotational axis based on the physical profile of the cam as the cam rotates around the rotational axis; and
compressing the air bladder with a finger formed on the hinge as the hinge moves in the direction away from the rotational axis and decompressing the air bladder with the finger as the hinge moves in the direction toward the rotational axis.

11. The method of claim 9, wherein the fluid is a liquid or a gas.

12. The method of claim 9, wherein the soft robot is coupled to the air bladder via a hose.

13. The method of claim 9, wherein a volume capacity of the soft robot is equal to a volume capacity of the air bladder.

14. The method of claim 9, further comprising:
rotating at least one other cam coupled to the camshaft around the rotational axis when the camshaft is driven;
compressing or decompressing at least one other air bladder based on a physical profile of the at least one other cam as the at least one other cam rotates around the rotational axis;
expelling fluid from the at least one other air bladder during compression of the at least one other air bladder and drawing fluid into the at least one other air bladder during decompression of the at least one other air bladder; and
actuating at least one other soft robot coupled to the at least one other air bladder to move based on the fluid expelled from the at least one other air bladder that is inserted into the at least one other soft robot during compression of the at least one other air bladder or the fluid removed from the at least one other soft robot that is drawn into the at least one other air bladder during decompression of the at least one other air bladder.

15. The method of claim 14, wherein the cam and the at least one other cam compress or decompress the same air bladder.

16. The method of claim 14, wherein:
the soft robot comprises a first air chamber and a second air chamber,
the air bladder expels fluid into the first air chamber or draws fluid from the first air chamber, and
the at least one other air bladder expels fluid into the second air chamber or draws fluid from the second air chamber.

17. An actuation system for actuating a soft robot, the actuation system comprising:
a main camshaft;
a motor configured to drive the main camshaft to rotate around a first rotational axis;
a branch camshaft coupled to the main camshaft in a non-collinear manner, wherein the branch camshaft rotates around a second rotational axis as the main camshaft rotates around the first rotational axis;
an air bladder configured to expel fluid from the air bladder during compression of the air bladder and draw fluid into the air bladder during decompression of the air bladder;
a cam coupled to the branch camshaft and configured to:
rotate around the second rotational axis when the camshaft is driven, and
compress or decompress the air bladder based on a physical profile of the cam as the cam rotates around the second rotational axis; and
a soft robot coupled to the air bladder, wherein the soft robot is actuated to move based on the fluid expelled from the air bladder that is inserted into the soft robot during compression of the air bladder or the fluid removed from the soft robot that is drawn into the air bladder during decompression of the air bladder.

18. The actuation system of claim 17, wherein the branch camshaft is coupled to the main camshaft via a universal joint.

19. The actuation system of claim 17, wherein the fluid is a liquid or a gas.

20. The actuation system of claim 17, wherein the soft robot is coupled to the air bladder via a hose.

* * * * *